United States Patent [19]
Young, Jr.

[11] 3,949,281
[45] Apr. 6, 1976

[54] CONTROL SYSTEM

[76] Inventor: William O. Young, Jr., 116 Marlin Drive, Spartanburg, S.C. 29302

[22] Filed: Oct. 22, 1974

[21] Appl. No.: 517,011

[52] U.S. Cl. .................. 318/77; 318/7; 318/313
[51] Int. Cl. .......................................... H02p 7/28
[58] Field of Search ................. 318/7, 77, 313

[56] References Cited
UNITED STATES PATENTS

| | | | |
|---|---|---|---|
| 2,147,421 | 2/1939 | Bendz | 318/313 X |
| 2,147,467 | 2/1939 | Stephenson | 318/7 X |
| 2,875,388 | 2/1959 | Scheu | 318/77 X |
| 3,584,805 | 6/1971 | Lee | 318/7 X |
| 3,614,563 | 10/1971 | Jones | 318/7 |

*Primary Examiner*—B. Dobeck
*Attorney, Agent, or Firm*—Wellington M. Manning, Jr.

[57] ABSTRACT

A system for synchronizing the operation of two machines, a master and a slave, having a flow of material therebetween. A signal generator is associated with the master machine and depending upon an input from the master machine, generates a signal, normally a voltage that provides input to a variable speed control of the slave. Magnitude of the generated signal should be at least above that required to operate the slave at the maximum end of its normal operating range. Signal tuning means, preferably potentiometers are in line between the signal generator and the slave to tune the generated signal according to a predetermined plan. Certain of the signal tuning means are also connected to detectors located along the material path and receive feedback from the detectors to ascertain certain tuning of the signal. A method of synchronizing the operation of the master and slave machines is also disclosed and claimed herein.

20 Claims, 5 Drawing Figures

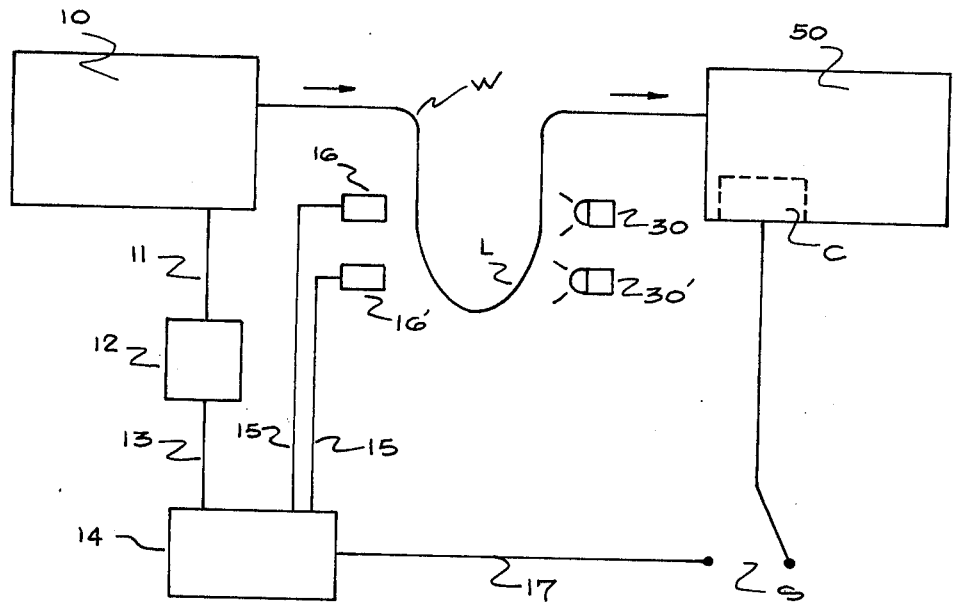
FIG. 1
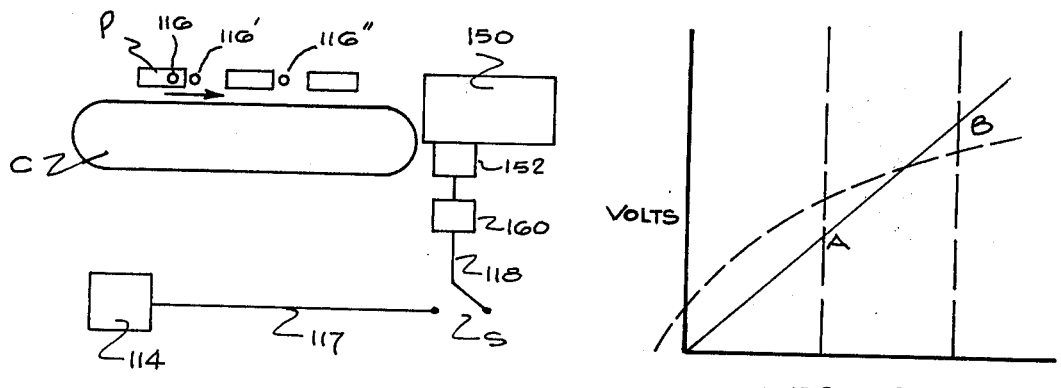
FIG. 3
FIG. 4

CONTROL SYSTEM

BACKGROUND OF THE INVENTION

Numerous control systems utilizing photocells or other type detectors have been devised for sensing the position of a material loop in the textile, steel and magnetic tape environs, and depending upon the position of the material in the loop, providing a signal to one of the machines to set the speed of the machine. Generally speaking, the position of the material, web, or the like has been detected intermittently or continuously to provide a proportional output from a photocell. The material handling machine would thus be corrected by an amount indicated as necessary by the detectors.

Such prior art systems have normally employed variable speed drive units for the web handling machine to be controlled with a direct input through the drive being received from the photocell. Constant adjustment of the loop may thus be necessary to compensate for adjustment overages as the result of the detection at the photocell. Over compensation, of course, causes a controlled machine or slave to be sped up from an abnormally slow speed to a greater than required speed or the reverse. A reverse compensation must then be made to return the speed toward a proper rate. Large changes are jumpy in both directions, and preclude a smooth drive system for the web handling equipment. Certainly, with overall conditions being desirable for smoothness and optimum operability, a smooth web drive is quite important, especially for a web that is susceptible to distortion or destruction due to abrupt changes in speed or direction. Hence, it is very advantageous to afford a system where the modifications to the drive speeds of the slave are more accurate and constantly approach an optimum situation, where large speed changes are generally not involved.

In general, especially where web handling equipment comprises two independent machines, operation of the slave machine is controlled by the master machine with a web loop being located between the two, independent machines. To provide a proper loop control, prior art techniques have sometimes included modification of the internal controls of the slave, to provide a similar system to that found in the master machine. This approach is disadvantageous, in that, the internal controls of the slave must be first studied and known to permit proper modification to achieve suitable input from the master. A large number of different drive systems per se, and control units for drive systems, present problems insofar as design of a standardized system is concerned. Moreover, once the slave controls have been modified to permit association with the master for automatic operation, the slave cannot then be returned to manual, separate operation without readjustment.

The present invention affords a system that permits ready synchronization of a master and slave machine without internal modification of either. Further, the present system is quite stable, and may be utilized in virtually any process having a flow of material between two machines. Disadvantages as discussed above are virtually absent when the present system is utilized.

The present invention, both as to the method and apparatus, represents improvements over the prior art. Exemplary of the prior art are U.S. Pat. Nos. 2,888,259 to Taylor et al; 2,900,143 to Bandy et al; 3,047,198 to Long; 3,177,749 to Best et al; 3,236,429 to Klein; 3,240,411 to Zarleng; 3,250,480 to Jacoby; 3,435,245 to Lee; 3,550,878 to Crisp et al; 3,656,855 to Collart et al; and 3,676,009 to Brendemuehl.

SUMMARY OF THE INVENTION

It is an object of the present invention to provide an improved system for synchronizing two independent machines associated by a flow of material therebetween.

Another object of the present invention is to provide a system that may be deployed between a master machine and a slave machine for synchronizing operation of the two when a web is being handled by the two machines.

Still another object of the present invention is to provide an improved loop control system that is capable of sensing the speed of a material flow from a master to a slave machine and controlling operation of the slave thereby.

Another object of the present invention is to provide an improved method for synchronizing two independent machines associated by a flow of material therebetween.

Still another object of the present invention is to provide a method for synchronizing a master and slave machine without knowledge of the internal control system of either.

Generally speaking, the present apparatus for synchronizing a master and a slave machine having a flow of material therebetween comprises a signal generator connectable to said master to receive an input and generate a signal therefrom, the magnitude of said signal being at least in excess of that approximate amount needed to cause said slave to operate at a maximum of its normal operating range; signal modifying means electrically connected to said signal generating means for reducing said signal by a predetermined amount; a plurality of detectors located along a path of travel for said material and electrically connected to at least certain of said signal modifier means, actuation of said detectors influencing said signal by a minor amount only, whereby a signal of a proper magnitude is supplied to control for said slave to cause said slave to operate at a rate related to the master.

More specifically, the apparatus of the present invention preferably includes a tachometer generator as a signal generating means. The tachometer generator is electrically connectable to a shaft or other means on the master machine. The tachometer generator or other signal generator is designed or selected to produce a voltage or other signal that is a function of input from the shaft of the master machine. Magnitude of the voltage is predetermined to be at least in excess of that required to operate the slave machine at a maximum in the normal operating range of same. Signal output is then trimmed, preferably in rough fashion by a bias resistor to slightly above that magnitude needed to operate the slave corresponding to input from the master. Slight variation in material flow, web speed for example, is also considered, and compensation therefor is provided by a plurality of detectors and signal trimming means responsive thereto. The approximate voltage is thus perhaps finely trimmed dependent upon actuation of said detectors. Fine trimming of the voltage signal is by a small amount which avoids a jumpy compensation condition. The trimmed voltage signal then provides input to the slave control system to cause the slave machine to operate at a rate coordinated with the master.

A preferred circuitry includes a tachometer generator followed by a first voltage trimming means, preferably a bias resistor, connected thereacross. The voltage subsequent to the first trimming means is approximately that required to operate the slave at a speed corresponding to operation of the master. Since slight variations are inevitable it is further preferred to include a plurality of detectors along the material path with the detectors being electrically connected to further voltage trimming means, preferably potentiometers for finely trimming the voltage, if needed. Each of the fine trimming potentiometers is preset to trim the voltage signal by a predetermined amount when actuated.

For example, two detectors such as photocells may be placed along a web loop, one photocell detecting a short loop and the other a long loop, accompanied by a small voltage correction for either. The fine voltage correction, however, is not proportional to the exact location of the web. Instead, regardless of the position of the web with respect to the actuated photocell, the same correction is made for actuation of the particular photocell. The present system is thus very stable to corrections caused by feedback from the material detectors.

The method according to the present invention for operatively connecting two independent machines having a material flow therebetween, i.e., synchronizing, generally comprises the steps of determining a variable of a first, master machine and comparative linear speed of the material being handled thereby; determining the input requirements of a second, slave, machine for a range of linear material speeds; converting said first machine variable to an input signal for the second machine, the magnitude of said signal being at least in excess of the amount required to operate the second machine at a maximum of a normal operating range for same; adjusting said signal downwardly to a magnitude to cause said slave to operate at a rate proportional to the master, whereby said slave is synchronized with respect to the speed of material moving between the master and the slave.

The method of the present invention more specifically includes different possibilities for adjustment or trimming of the signal. A first adjustment may be performed by a bias resistor, preset to bring the signal into an approximation of the magnitude required to cause the slave to operate at a rate coordinated with the master. This adjustment affords, in part, the improved stability of the present system. Further, fine adjustment is possible as a function of material positioned along the material path between the master and slave machines. Moreover, in certain situations, a slave machine may not operate immediately upon receipt of input, but may idle so to speak at a very low input level. Such a unit may be suitably controlled by the present invention, especially when a preset power factor is included to boost the generated signal by an amount approximating the initial input required to cause the slave to start operating.

In practicing the present invention, as mentioned above, it is not necessary to know the internal configuration of the slave machine control system. Instead, only the operational parameters of the unit are required such as signal input necessary to cause the slave to operate within such parameters. Thereafter, the operational curve of signal input versus linear speed of a material being handled by the machine may be graphically plotted. The plot for the slave is then matched by the adjusted output of the signal generator for linear speed of a material being handled by the master machine. Once the curves approximate each other, at least along the normal operating ranges, a signal generated from input at the master is adjusted to control the slave at a speed synchronized thereto with further possible adjustment being dependent upon position of material between the machine.

BRIEF DESCRIPTION OF THE DRAWINGS

FIG. 1 is a schematic illustration of a control system according to the teachings of the present invention.

FIG. 3 is a schematic illustration of a further embodiment for synchronizing two machines according to the present invention.

FIG. 4 is a graphic illustration of operational curves of a slave and a master machine as utilized in performing the method of the present invention.

DESCRIPTION OF THE PREFERRED EMBODIMENTS

Figure 2A:
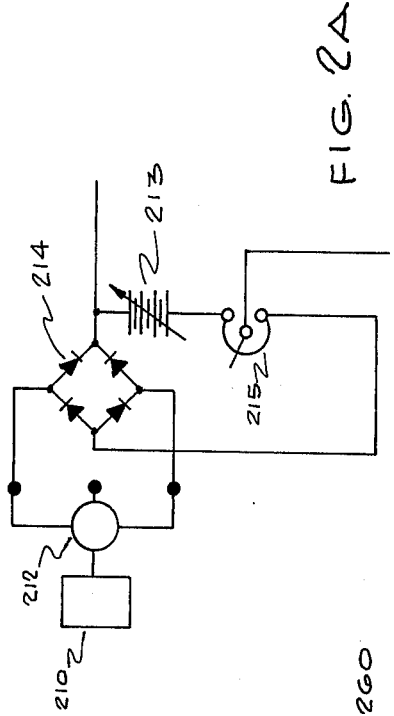
FIG. 2A is a partial schematic of a further embodiment of an electrical system according to the present invention.

Referring to the Figures, preferred embodiments of the present invention will now be described in detail. Various machines, handling many different kinds of materials may be controlled by the method and apparatus of the present invention. Webs of indeterminate length are probably in the forefront in the textile industry. Steel webs, plastic tapes and other lengths of material may, however, serve as the material being handled by the master and the slave machines. Further, however, the material may be something other than a web. For example, a series of like shaped articles of any description traveling along a conveyor may serve as the material. Likewise, numerous other examples are possible. A web is referred to hereinafter and unless otherwise specified is only exemplary of a suitable material. The master and slave machines are generally depicted as a master feeding a slave. Such is not necessary, however, and either can have material flowing from it to the other machine.

A schematic of the present invention is depicted in FIG. 1. A web handling machine 10 (master) is shown feeding a web of material W to a web handling machine 50 (slave). Intermediate the two machines, web W passes through a loop forming area L which according to customary practices is utilized to afford some material storage between machines, where the position of the material can be monitored for control purposes. A signal generator 12, preferably a tachometer generator, is electrically connected in suitable fashion (not shown) to a selected portion of master machine 10. The particular portion of master 10 provides a parameter input to the signal generator 12. Generator 12 is preselected or provided with stepping switches or the like, if needed, to generate a signal, generally a voltage, from the input from master 10. Voltage output from tachometer generator 12 is of a magnitude at least higher than that required to operate slave 50 at a maximum along the normal operating range of same. Signal voltage passes along a connector 13 to a control unit 14 where the voltage is adjusted by a predetermined amount to relate input from the master to voltage required to operate slave 50 at a proportionate rate.

In the loop area L, a plurality of lights (two shown) 30 and 30' direct beams of light across the loop area in which a web would reside. If a part of the web W intercepts the beam of light, a photocell 16 or 16' for the respective light 30 or 30' will not receive light. Conversely, should the web shorten or lengthen, depending upon the position of the web and the number of lights and photocells utilized, corresponding beams of light would be intercepted or permitted to pass. While the photocells are illustrated, other types of detectors may be employed as well as other types of photocells. Depending upon the particular type of photocell or detector that is employed a signal is imparted to the control unit 14 via connectors 15 to further influence the voltage input to the slave control system C accordingly. A conventional switching system S may be employed to convert the slave machine 50 to manual operation from automatic operation or the reverse, if desired. As mentioned above, the above switching capability is not available if the internal configuration of the controls have been modified to accommodate the present system.

As mentioned above, FIG. 1 is illustrative of a system utilizing an electronic control system C for determining the speed of the slave machine 50. Should, however, a P.I.V., rheostat, variable pitch sheave or other mechanically actuated speed control be employed, some force must be applied to a mechanical actuator to vary the speed of slave 50. FIG. 3 schematically illustrates such an arrangement. A slave machine 150 is equipped with a mechanically actuated variable speed regulator 152 that requires some force to move a lever or the like and cause a change in the speed of slave 150. A mechanical actuator 160 of any suitable type is thus incorporated in the system along the connector 118. Voltage or other signal output from the control unit 114 thus provides input to the mechanical actuator 160. The voltage applied thereto is converted to a mechanical force which causes a proportional movement of the variable mechanical speed regulator means 152 to change the speed of slave machine 150. Physical connections between the mechanical actuators 152 and the mechanical control means 160 for slave machine 150 are not illustrated, since the actuators per se and means to connect same are well established in the art. In this regard, however, both rotary, linear or other actuators may be utilized depending upon the particular control system 152 for slave machine 150. Certain of the controls, for example, may require a rotary movement such as may be needed for a P.I.V., whereas, others will require a lateral movement such as a variable pitch sheave to actuate the control. In any event, the signal input to the actuator 160 will cause a movement of the mechanical control 152 for the slave and the slave machine speed will thus be appropriately controlled thereby.

FIG. 3 further illustrates another embodiment of the present invention. Note that the web loop L of FIG. 1 has been replaced by a conveyor C having a plurality of packages P thereon with detectors 116, 116' and 116'' appropriately positioned therealong. Detectors 116, 116' and 116'' are, of course, connected into control unit 114 and depending upon actuation of same may make fine adjustment to the generated signal input for slave 150. For example, each package P being the same size, passes across conveyor C at a particular interval, to be received and processed by slave 150. Detector 116'', when actuated, in turn actuates detectors 116 and 116'. If detector 116 senses the presence of a package P and 116' does not, no adjustment is made. Otherwise, approximate adjustment of the signal is made to compensatorily influence the speed of slave 150.

Figure 2:
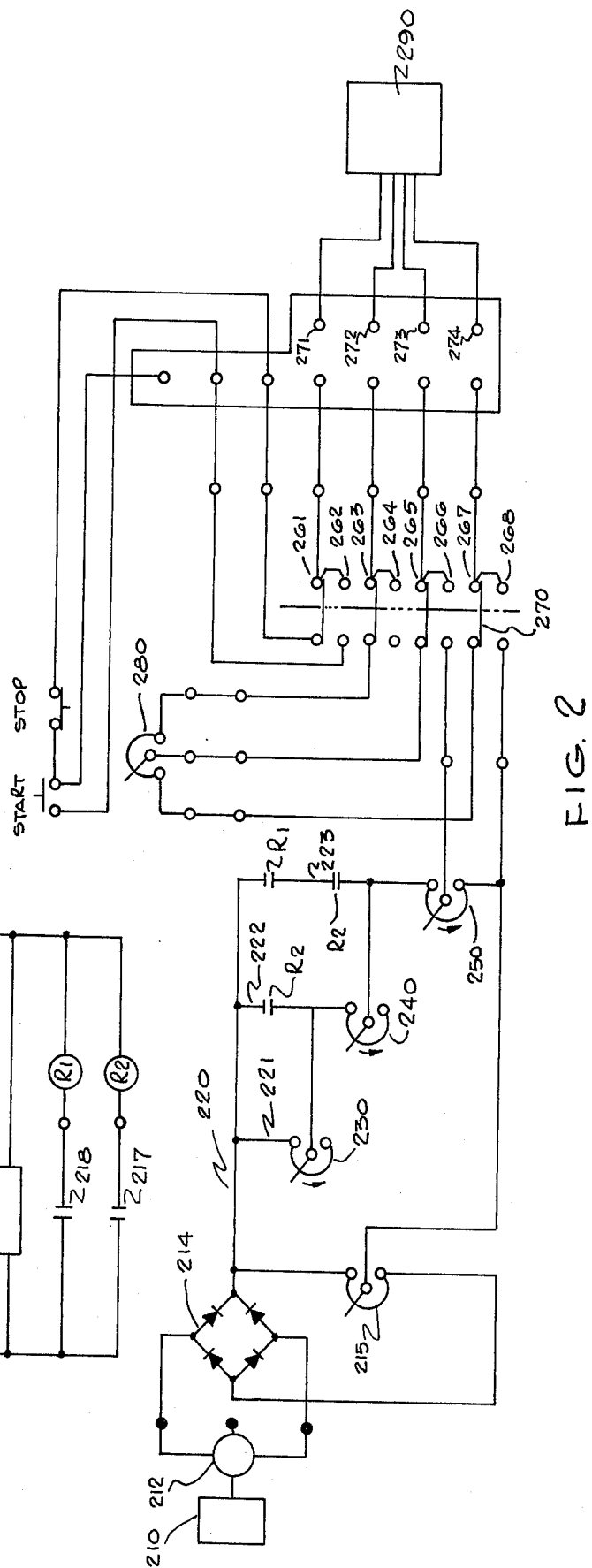
FIG. 2 is a schematic of an electrical circuit arrangement according to teachings of the present invention.

A schematic for an electrical circuit suitable for the system of the present invention is illustrated in FIG. 2. A tachometer generator 212 is connected to a shaft (not shown) at the output end of the master web handling machine 210. Connection between the tachometer generator and the shaft is not shown since such would be conventional to one skilled in the art, using standard apparatus. Depending upon the revolutions per minute produced by the shaft, tachometer generator 212 develops a certain voltage signal. Since voltage of a particular magnitude will be required to operate the slave 290, stepping switches or the like may be utilized, if necessary, to upgrade the voltage produced by generator 212 to the desired level. Preferably, the magnitude of developed voltage at generator 212 is substantially above that required to operate slave 290 at maximum speed, most preferably about twice the needed magnitude, whereby the developed voltage may be reduced as needed to properly coordinate slave 290 and master 210. Magnitude of the generated voltage should be at least greater than needed to operate the slave at the top of a normal operating range for same.

Voltage output from the tachometer generator is converted to a direct current signal by a full wave rectifier 214. If, however, a D.C. generator is employed the rectifier is not needed. A potentiometer 215 is connected across the full wave rectifier 214 and generator 212. Potentiometer 215 is preset to provide a certain bias resistance and reduce the voltage signal by a predetermined amount. The voltage input to slave 290 is thus adjusted to a magnitude approximating that required for operation of slave machine 290 for the particular input from master 210.

Photocells 216 and 216' are located in the loop area L where photocell 216 monitors an upper portion of the web loop and 216' monitors a lower portion of the web loop. Light sources 230 and 230' respectively, for each photocell 216 and 216' transmit across the loop area L. If the web is positioned above the beam emitted from light 30', the beam strikes photocell 216' which closes a relay 217. Closing of relay 217 causes further relays R2 in the control system to close. Similarly, position of web W above light 230 causes light to strike photocell 216 and cause relays 218 and R1 to close. For the sake of simplicity, electrical connection between relays 217 and R2 and relays 218 and R1 are illustrated schematically. Relays R1 and R2 in the control system determine whether potentiometers 230, 240 and/or 250 are introduced into the line to adjust the voltage signal by a small amount, providing proper input to slave 290 to compensate slightly for material accumulation between the machines.

A switch 260 having start-stop poles is shown in electrical connection with terminals 261 and 262 which are, in turn, in electrical connection with leads 271, 272, 273 and 274, respectively, that supply power to slave machine 290. As illustrated in FIG. 2, switch 260 is in the stop mode whereby slave machine 290 will not operate. A further switch 270 makes connection with contacts 267 or 268 and so determines whether the slave operates automatically or manually. When contacts 268 are energized, slave 290 functions automatically as dictated by the control system of the present invention. When contacts 267 are engaged, manual operation is followed where slave speed is controlled by a potentiometer 280, the center tap of which is moveable from left to right and vice versa to divide the voltage thereacross and consequently the speed of slave 290.

Under automatic operation, connections are made across contacts 264, 266 and 268, whereby the manual control 280 is bypassed and the controls of the present invention are brought into operation. The voltage signal generated by tachometer generator 212 is adjusted by the preset bias resistance of potentiometer 215, and further, if needed, by one or more of potentiometers 230, 240 and 250. A voltage across contacts 266 and 268 results, is supplied to slave 290 via power contacts 273 and 274, and causes slave 290 to operate at an approximate speed relative to master 210.

A further embodiment of the circuitry of the present invention is shown in FIG. 2A. A variable independent power source 213 is in series with generator 212 and introduces an additive voltage to output from generator 212. The additional voltage signal compensates for the situation illustrated in the graph in FIG. 4 where the slave machine requires a certain voltage before any linear movement of material. This component will be discussed in more detail hereinafter.

Having now described apparatus according to the teachings of the present invention, operation of same will be described in conjunction with an explanation of the method according to the teachings of the present invention.

An example of such information is plotted in FIG. 4 where the solid line plot represents the master and the broken line plot represents the slave. To obtain the plot for the master, the operational parameter, e.g., revolution of a shaft has been converted to volts. Ideally, both plots should coincide along the complete operational range. Frequently, as is the case, the original plots appear as shown in FIG. 4 where the slave curve is not linear, and does not originate at the apex of the graph. The generated signal from the master must therefore be adjusted to conform as nearly as practical to the operational curve of the slave. Since a majority of combination of machines utilize only a portion of the complete operational scale of the machines, it is often sufficient to match the curves only in the normal operation ranges as indicated between A and B.

To match the curves as illustrated in FIG. 4, prior art techniques modified the slave to bring the slave curve down to an approximate linear function, intersecting the ordinate axis at zero. As mentioned hereinbefore, once these modifications are made to the slave, it is no longer feasible to return the slave to normal operation without readjustment. The present invention calls for movement of the master curve to coincide with the slave curve, but without internal modification to the master as discussed hereinafter.

Introduction of the independent power source in series with the tachometer generator adds to the voltage signal and moves the master curve upwardly along the ordinate axis by an amount dependent upon magnitude of the additive power. The intersecting end of the master curve may not coincide with the slave curve. Instead, the master curve point of intersection may be moved upwardly until approximate matching of the curves at the beginning of the normal operating range of the slave. Thereafter, the slope of the master curve may be moved up or down by adjustment of the main trimming potentiometers in the present control unit, with the detector potentiometers adding a fine tune capability on opposite sides of the curves to compensate for material drift or the like.

Practice of the method taught by the present invention requires operational knowledge of both the master and slave machines, but knowledge of the internal configuration of controls is not needed. The master machine is evaluated to determine some operational variable related to linear speed of material, normally revolution speed of a shaft. Similarly, voltage or other signal input to the slave is determined for a range of linear material speed.

The method performed thus includes the steps of determining an operational curve for a slave machine; detecting an operational characteristic of a master machine and generating a signal therefrom, the magnitude of said signal being at least in excess of that required to operate the slave at a maximum of a normal operating range; adjusting the operational signal to an amount predetermined to cause said slave to operate along its normal operation range at a rate proportional to the operational characteristic of said master; monitoring a material passing between said master and slave machines and further decreasing said signal when dictated by the condition of said material between said machines, whereby said slave and said master machines are synchronized.

Having described the present invention in detail, it is obvious that one skilled in the art will be able to make variations and modifications thereto without departing from the scope of the invention. Accordingly, the scope of the present invention should be determined only by the claims appended hereto.

What is claimed is:

1. Apparatus for synchronizing the speeds of a master machine and a slave machine having a material passing therebetween comprising:
    a. signal generator means connectable to said master machine and to a variable speed control of said slave, said signal generator means receiving an operational characteristic input from said master and generating a signal responsive thereto, the magnitude of said signal generated being at least in excess of an amount needed to operate said slave at an approximate maximum of a normal operating range for same;
    b. signal adjustment means electrically associated with said signal generator on the output side, said adjustment means being preset to reduce the signal a predetermined amount; and
    c. a plurality of material detectors located between said master and slave machines and being electrically associated with a portion of the signal adjustment means, said detectors monitoring said material and influencing said signal when necessary due to detection of a material change.

2. Apparatus as defined in claim 1 wherein said signal generator is a tachometer generator.

3. Apparatus as defined in claim 2 wherein said tachometer generator has a full wave rectifier associated therewith to convert the generated signal to direct current.

4. Apparatus as defined in claim 1 wherein said signal adjustment means comprises a first potentiometer electrically connected across output of said signal generator and a plurality of second potentiometers associated with said first potentiometer and said material detectors, influence of said second potentiometers being dependent upon actuation of said detectors by said material.

5. Apparatus as defined in claim 1 wherein said detectors are photocells.

6. Apparatus as defined in claim 1 comprising further an independent power source in series with said signal generator.

7. Apparatus as defined in claim 1 comprising further mechanical actuator means connectable to said slave speed control and said output side of said signal generator, whereby said signal is converted to a force by said mechanical actuator, said force being coordinate to said signal to cause said slave to operate at a rate proportional thereto.

8. Apparatus for synchronizing the speeds of a master material handling machine and a slave material handling machine comprising:
   a. voltage generator means associable with a variable speed drive control of said slave and an element of said master to receive an input therefrom and generate a voltage as a function of said input, the magnitude of said generated voltage being at least in excess of an amount required to operate said slave machine at a maximum of the normal operating range of same;
   b. a first resistor connected across said voltage generator output, said resistor being predetermined to adjust said generated voltage by a predetermined amount;
   c. a plurality of second resistors connected across said voltage output; and
   d. a plurality of material detectors located along a material path between said master and slave machines and being connected to certain of said second resistors, the inclusion of said second resistors to adjust said generated voltage being determined by actuation of said detectors.

9. Apparatus as defined in claim 8 wherein said voltage generator is a tachometer generator.

10. Apparatus as defined in claim 8 wherein said resistors are variable resistors.

11. Apparatus as defined in claim 10 wherein said variable resistors are potentiometers.

12. Apparatus as defined in claim 8 wherein said material being handled is a web.

13. Apparatus as defined in claim 8 wherein said variable speed control is mechanical and further comprising a mechanical actuator connected to said speed control and associated with said voltage generator, whereby a voltage input to said actuator causes a mechanical force to cause said speed control to operate said slave at a particular speed.

14. Apparatus as defined in claim 8 comprising further switch means provided between said voltage generator and said slave, said switch means permitting said slave to operate automatically or manually.

15. A method for synchronizing a master and a slave machine having a material passing therebetween comprising the steps of:
   a. determining an operational characteristic of said master machine for a corresponding linear material speed along at least a normal operating range of same;
   b. determining an input requirement of said slave for a corresponding linear material speed along at least a normal operating range of the slave;
   c. generating a signal from input for said operational characteristic of master, said signal being predetermined to have a magnitude at least in excess of the input requirements of said slave at the maximum speed for the normal operating range; and
   d. adjusting said generated signal to synchronize same with an input to the slave drive that will cause a slave speed proportional to said master.

16. The method as defined in claim 15 wherein the generated signal is adjusted in a plurality of steps.

17. The method as defined in claim 15 wherein a further independent signal is added to the generated signal.

18. The method as defined in claim 15 wherein the signal is adjusted first by a resistance of predetermined value and thereafter is further adjusted by monitoring said material passing between said machines, detecting abnormalities in said material passage and adjusting the signal to compensate for said abnormality.

19. The method as defined in claim 15 wherein the material is a textile web.

20. The method as defined in claim 15 wherein adjustment of said signal is accomplished by a first preset potentiometer to roughly adjust the signal to the normal operating range of the slave and further adjustment is made by a plurality of second preset potentiometers associated with material detectors, said second potentiometers being dependent upon actuation of said detectors.

* * * * *